United States Patent [19]

Hochstrate

[11] 4,196,973
[45] Apr. 8, 1980

[54] TRANSFLECTOR FOR ILLUMINATED ELECTROOPTIC DISPLAYS

[75] Inventor: Paul E. Hochstrate, Bristol, Conn.

[73] Assignee: Timex Corporation, Waterbury, Conn.

[21] Appl. No.: 935,187

[22] Filed: Aug. 21, 1978

[51] Int. Cl.² ............................................. G02F 1/13
[52] U.S. Cl. ................................. 350/338; 350/345
[58] Field of Search ............................. 350/338, 345

[56] References Cited
U.S. PATENT DOCUMENTS 4,042,294  8/1977  Billings et al. ................. 350/345

Primary Examiner—Edward S. Bauer
Attorney, Agent, or Firm—Edward J. Timmer

[57] ABSTRACT

Disclosed is an improved transflector especially useful in illuminated liquid crystal display devices operative in the reflective and transmissive modes for significantly enhancing the optical viewability thereof, especially in the daytime reflective mode. Typically, the improved transflector is a translucent plate-like member including as an essential feature a layer portion of white transluscent material having a certain minimum effective thickness in the primary direction of light propagation in the device such that ambient light incident upon the white layer during daylight viewing is subjected to enhanced diffusion, fringing and brightening to provide a brighter appearing background and darker-appearing display characters to the daytime viewer for improved contrast and also to provide an apparent increase in the "brush-stroke" width of the display characters to the same viewer.

10 Claims, 1 Drawing Figure

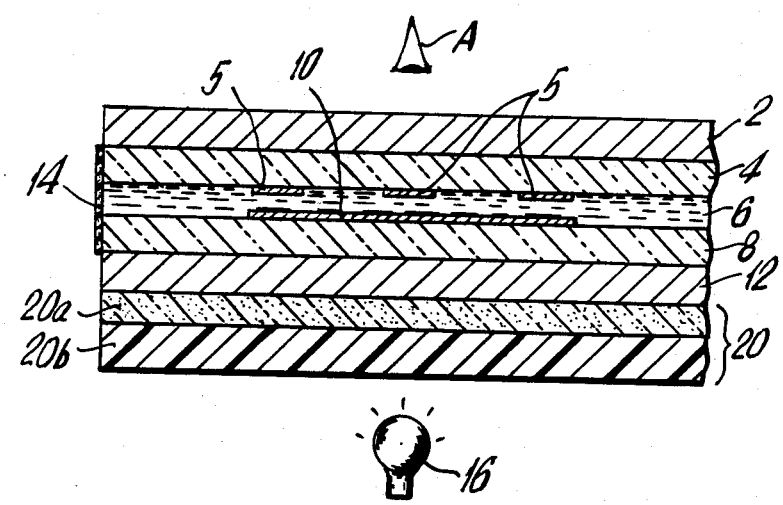

TRANSFLECTOR FOR ILLUMINATED ELECTROOPTIC DISPLAYS

BACKGROUND OF THE INVENTION

1. Field of the Invention

This invention relates to illuminated electrooptic display devices useful for horological purposes and, more particularly, to such display devices which are operative in the reflective and transmissive modes and include a so-called transflector for this purpose. In particular, the invention involves an improved transflector which enhances the viewability of illuminated liquid crystal display devices.

2. Description of the Prior Art

Various types of electrooptic displays have been employed for electronic wristwatches, clocks and other devices. One type of display is the field effect, twisted nematic liquid crystal display, the operation and construction of which are well known and described, for example, in the Fergason, U.S. Pat. No. 3,731,968. It is also well known that displays can operate both in the reflective and transmissive modes; ie., using either reflected ambient light for daytime viewing or backlighting with one or more actuable light sources behind the display for nighttime viewing. In this regard, see the Girard U.S. Pat. No. 3,712,047; Luft U.S. Pat. No. 3,799,647 and Richardson U.S. Pat. No. 3,864,905. The latter patent employs an electrical lamp at the center of an edge of the display and means for dispersing light rays or specular light.

Also known are means for illuminating clock dials using a light source with means to first disperse the specular light rays to the desired location and then to diffuse, ie, scatter, the light in a particular area. Exemplary are U.S. Pat. No. 2,916,871 to Wegner, U.S. Pat. No. 3,514,940 to Kern et al, and U.S. Pat. No. 3,574,993 to Black. The latter patent shows that it is known to employ a diffusion plate of transparent plastic material for carrying light rays, the plate having a reflector adjacent one surface and a roughened contour on the other surface to scatter light. British Pat. No. 1,417,958 discloses a similar light conductor which is a transluscent member, for example, frosted glass.

A particular type of liquid crystal display includes a liquid crystal cell having image-forming electrodes, upper and lower polarizers on opposite sides of the cell and a so-called transflector behind the lower polarizer. A light source typically is positioned behind or at the side of the transflector for directing light therein. The transflector functions essentially as a oneway mirror so that the display can operate in the reflective mode in ambient light and in the transmissive mode at night with the aid of backlighting by the light source. In daylight, ambient light enters the display and passes through the liquid crystal cell, where it may be optically altered, and then is reflected from the transflector back toward the observer. At night, the transflector receives light from the light source and transmits it upwardly toward the observer by light scattering, diffusion, and reflection within the transflector. As a result of the light diffusion effected by the transflector, the display characters are more or less uniformly illuminated. A typical transflector may comprise silvered glass or glass with a gray filter. However, other materials which are transluscent to light have also been widely used. Exemplary of these are styrofoam of white, gray or silver hue, polystyrene, and polypropylene in thin layers or sheets. Although satisfactory back lighting or liquid crystal displays has been achieved with the aid of the transflector, it has not been obtained without some sacrifice in the daylight viewability of the display. More specifically, the quality of the daylight image has been adversely affected by the transflector in that a reduction in the contrast between the image and background, especially a dark image on a light background has been observed. Of course, any reduction in the contrast ratio of a liquid crystal display adversely affects not only the aesthetic appeal to the observer but also its utility. To this end, a concentrated effort has been made to improve the quality of daylight viewability of back-lighted liquid crystal displays employing transflectors.

SUMMARY OF THE INVENTION

Accordingly, the present invention provides an improved transflector for use with illuminated electrooptic display devices, especially those of the liquid crystal type operative in the reflective and transmissive modes, to overcome the aforementioned disadvantages of the prior art. In a typical embodiment of the invention relating to liquid crystal displays, the improved transflector is positioned behind the lower polarizer of the display sandwich and is in the form of a translucent plate-like member including as an essential and important feature thereof a layer portion of white translucent material having at least a minimum effective thickness in the principal direction of light propagation in the device such that ambient light incident upon the white transluscent layer during daytime operation is subjected to sufficiently enhanced diffusion, fringing and brightening by said layer that the display characters appear darker and the background appears brighter to the daytime observer and also that the "brush-stroke" width of the display characters is apparently increased to the same observer. The net effect of the improved transflector is to provide a liquid crystal display having better daytime contrast between the display characters and background and better overall daytime viewability than liquid crystal displays employing prior art transflectors. Furthermore, as a result of enhanced diffusion, fringing and reflection of light received by the transflector from the light source of the device, the night viewability of the display is also considerably improved.

In a preferred embodiment of the invention, the white transluscent layer of the improved transflector comprises a white styrofoam sheet of the required minimum thickness bonded in a sandwich or lamellar structure to one or more layers of styrofoam or other transluscent materials.

BRIEF DESCRIPTION OF THE DRAWINGS

Other advantages and objects of the present invention will be more fully understood from the following description when viewed in conjunction with accompanying drawing wherein:

The FIGURE is a cross-sectional view of an illuminated liquid crystal display employing the improved transflector of the invention.

DESCRIPTION OF THE PREFERRED EMBODIMENT

Referring first to the FIGURE, the details of a typical liquid crystal display device will be discussed although they are well known in the art. The device comprises a top polarizer sheet 2, a transparent substrate 4 having transparent electrodes 5, a thin layer 6 of twisted nematic liquid crystal material of positive dielectric anisotropy, some examples being given in the aforementioned, U.S. Pat. No. 3,731,986, a second transparent substrate 8 with transparent electrode 10 thereon and a bottom polarizer 12 having its axis crossed relative to top polarizer 2. Of course, those skilled in the art will recognize that the thickness of the display components are greatly exaggerated in the FIGURE for purposes of clarity. Especially exaggerated is the thickness of the liquid crystal layer 6 and electrodes 5, 10 which in actual practice is only about one mil thickness. The liquid crystal material is sealed between substrates 4,8 at the periphery by means such as epoxy resin 14. A light source 16 is positioned behind the display in conventional fashion for night viewing. Of course, the light source may be selected from various types including, but not limited to, an incandescent lamp, light emitting diode, beta-light and the like, and may be arranged in other cooperative positions relative to the display, such as for example adjacent the edge of one or both of the transparent substrates or above the top polarizer.

In accordance with the present invention, an improved transflector typically in the form of plate-like member 20 is positioned behind bottom polarizer 12 and in front of light source 16. As is apparent from the FIGURE, the transflector plate may be of sandwich or lamellar construction having layers 20a and b of one or more different translucent materials. The important feature of the transflector, however, is that at least one of the layers or lamellae, for example 20b, be made of white translucent material and have at least a certain minimum effective thickness in the principal direction of light propagation through the device, ie, the vertical direction in the FIGURE, such that ambient light penetrating the white layer during day viewing is subjected to sufficiently enhanced diffusion, fringing and brightening as compared to that effected with prior art transflectors to provide a brighter-appearing background and darker-appearing display characters to the daytime viewer at A and also to apparently increase the "brush-stroke" width of the display characters to the same viewer. Not only is the daytime contrast between the display characters and background improved by the brightening effect on the ambient light as a result of diffusing and reflecting from the white translucent layer but also the overall quality of the daytime is improved by the combination of said brightening and the increase in "brush-stroke" width of the display characters resulting from enhanced scattering and fringing of the ambient light reflected from the white translucent layer. As used herein, "brush-stroke" width is intended to mean the width of any segment of the viewed character.

Of course, these attributes of the display device employing the improved transflector make the device especially useful in horological instruments, in particular, electronic wristwatches.

The minimum effective thickness required for the white translucent layer 20b will depend upon several factors, including the type of translucent material utilized in the different layers of the transflector. In the present invention, white styrofoam sheet or plate has been found to be a preferred material for the white transluscent layer 20b. It has been determined that when transflector layer 20a is polystyrene sheet having a thickness of 0.015 inch, a white styrofoam sheet of 0.055 inch thickness is sufficient to impart improved daylight contrast and overall viewability to a twisted nematic liquid crystal display of conventional construction as shown in the FIGURE. When the transflector layer 20a is white styrofoam of 0.040 inch thickness, an additional white styrofoam layer 20b of 0.040 inch thickness has proved satisfactory in achieving the objects and advantages of the invention. In general, a white translucent layer 20b at least 0.040 inch in thickness is satisfactory regardless of the particular translucent layer 20a employed. Those skilled in the art will recognize that in the illustrated embodiment, translucent layer 20a may be selected from available translucent transflector materials including, but not limited to, silvered glass, glass with a conventional gray filter, styrofoam of white, gray or silver hue, polystyrene or polypropylene. Although white transluscent styrofoam is the preferred material for transflector layer 20b, other useful materials, such as for example white paint, white chalk, white paper, white cloth, as well as others, will become apparent to those skilled in the art. Typically the transflector sandwich is formed by adhesively bonding the different layers together using conventional adhesives and techniques. Of course, transflector constructions other than the sandwich or lamellar type can also be utilized in the invention and these will be readily apparent to those skilled in the art. If desired, the transflector sandwich may be joined by adhesive or other means to the bottom polarizer 12 to form a one-piece component.

In addition to enhancing the daytime viewability of the liquid crystal display, the improved transflector of the invention has been found to also substantially improve night viewability by providing enhanced diffusion, fringing and reflection of the light received from light source 16. The improvement in night viewability is manifested in the ability of the viewer to easily read the display characters in total darkness with the unaided eye.

Although the present invention has been described in detail hereinabove with respect to liquid crystal display devices, it is not so limited. For example, the improved transflector may find use in other illuminated electrooptic display devices such as electrochromic, electrolytic, electrophoretic and other devices. Furthermore, while the invention has been explained with respect to certain specific embodiments, it is understood that other uses are possible and that various modifications and substitutions can be made within the scope of the appended claims.

I claim:

1. In an electrooptic device including an electrooptic display cell operative either in a reflective or a transmissive mode and having a plurality of selectively actuatable electrode segments to form display characters, a light source for night illumination and a transflector member made of translucent material and disposed behind the display cell to diffuse and reflect incident ambient light for daytime viewing and to diffuse, reflect and transmit light received from the light source for night viewing, the improvement which comprises:

a transflector member which includes a sandwich construction of at least two translucent layers, at least one of which layers is made of white transluscent material having at least a minimum effective thickness in the principal direction of light propagation in the device such that ambient light incident upon said white transflector layer is subjected to sufficiently enhanced diffusion, fringing and brightening to provide a brighter-appearing background and darker-appearing display characters to the daytime viewer and also to provide an apparent increase in the "brush-stroke" width of the display characters to the same viewer, thereby improving daytime contrast and overall viewability, said improved transflector member also enhancing the readability of the display characters during night viewing as a result of enhanced diffusion, fringing and brightening of light received from said light source.

2. The electrooptic device of claim 1 wherein: the electrooptic cell is a liquid crystal cell and first and second polarizers are disposed on the top and bottom sides of the cell, the improved transflector member being disposed behind said second polarizer.

3. The electrooptic device of claim 1 wherein: the white transluscent layer is a sheet of white styrofoam of effective thickness.

4. The electrooptic device of claim 3 wherein: the other transparent layer is selected from the group consisting of polystyrene, polypropylene and styrofoam.

5. The electrooptic device of claim 1 wherein: said layer portion of white transluscent material is at least 0.040 inch in thickness.

6. In a liquid crystal display device including a liquid crystal cell operative either in a reflective or a transmissive mode and having a plurality of selectively actuatable electrode segments to form display characters, first and second polarizers on the top and bottom sides of the cell, respectively, a light source for night illumination and a transflector member made of transluscent material and disposed behind the second polarizer to diffuse and reflect incident ambient light for daytime viewing and to diffuse, reflect and transmit light received from the light source for night viewing, the improvement which comprises:

a transflector member in the form of a plate-like member which includes a sandwich construction of at least two translucent layers, at least one of which layers is a layer of white transluscent material having at least a minimum effective thickness in the principal direction of light propagation in the device such that ambient light incident upon said white transflector layer is subjected to sufficiently enhanced diffusion, fringing and brightening to provide a brighter-appearing background and darker-appearing display characters to the daytime viewer and also to provide an apparent increase in the "brush-stroke" width of the display characters to the same viewer, thereby improving daytime contrast and overall viewability, said improved transflector member also enhancing the readability of the display characters during night viewing as a result of enhanced diffusion, fringing and brightening of light received from said light source.

7. The liquid crystal display device of claim 6 wherein: the transflector sandwich and bottom polarizer are joined together to form a one-piece component.

8. The liquid crystal display device of claim 6 wherein: the white transluscent layer is a sheet of white styrofoam of required thickness bonded to another sheet of a material selected from the group consisting of polystyrene, polypropylene and styrofoam.

9. The liquid crystal display device of claim 8 wherein: the styrofoam sheet is on the bottom of the sandwich.

10. The liquid crystal display device of claim 5 wherein: the actuatable electrode segments are configured to form horological display characters.

* * * * *